(12) United States Patent
Alsbaiee et al.

(10) Patent No.: US 11,578,159 B2
(45) Date of Patent: Feb. 14, 2023

(54) AIR VOID CONTROL COMPOSITION FOR CARBONYL-CONTAINING MONOMER POLYMERIZATION

(71) Applicant: Arkema France, Colombes (FR)

(72) Inventors: Alaaeddin Alsbaiee, King of Prussia, PA (US); Evan Crocker, Downingtown, PA (US); Dana Lee Swan, Spring City, PA (US)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/468,001

(22) PCT Filed: Dec. 13, 2017

(86) PCT No.: PCT/US2017/066048
§ 371 (c)(1),
(2) Date: Jun. 10, 2019

(87) PCT Pub. No.: WO2018/112016
PCT Pub. Date: Jun. 21, 2018

(65) Prior Publication Data
US 2019/0330446 A1    Oct. 31, 2019

Related U.S. Application Data

(60) Provisional application No. 62/434,010, filed on Dec. 14, 2016.

(51) Int. Cl.
*C08F 220/14* (2006.01)
*C08F 2/38* (2006.01)
(Continued)

(52) U.S. Cl.
CPC .............. *C08F 220/14* (2013.01); *C08F 2/38* (2013.01); *C08F 265/06* (2013.01); *C08K 5/053* (2013.01); *C08F 220/16* (2013.01)

(58) Field of Classification Search
None
See application file for complete search history.

(56) References Cited

U.S. PATENT DOCUMENTS 4,885,125 A    12/1989  Kato et al.
5,061,747 A *  10/1991  Roach .................. C08K 5/05
                                                       524/379
(Continued)

FOREIGN PATENT DOCUMENTS

CN    102219974 B    2/2013
JP    2007277454     10/2007

*Primary Examiner* — Richard A Huhn
(74) *Attorney, Agent, or Firm* — Buchanan Ingersoll & Rooney P.C.

(57) ABSTRACT

The invention relates to the use of low levels of glycols and short chain diols to control air void formation in any polymerization reaction having carbonyl-containing monomers, and preferably carboxylic acid ester monomers, at a level of at least 10% of total monomer, where the monomer has a peak polymerization exotherm temperature of greater than the boiling point of the monomer. The glycols and short chain diols are used in the polymization mixture at levels of 0.5 to 10 weight percent, based on the carboxylic acid ester-containing monomer. It is believed the glycols and short chain diols hydrogen bond with the —(C=O)O— containing monomer to increase the monomer boiling point, and decrease or even eliminate the formation of air voids due to monomer boiling. The invention is especially useful in polymerization of methyl methacrylate polymers and copolymers, either neat, or as a polymer composite system.

7 Claims, 2 Drawing Sheets

(51) Int. Cl.
*C08F 265/06* (2006.01)
*C08K 5/053* (2006.01)
C08F 220/16 (2006.01)

(56) References Cited

U.S. PATENT DOCUMENTS

| | | |
|---|---|---|
| 5,466,756 A | 11/1995 | Roach et al. |
| 2014/0154471 A1* | 6/2014 | Kodama .................. C08F 2/48 |
| | | 428/156 |
| 2014/0171546 A1* | 6/2014 | Graham .................. C08K 5/06 |
| | | 523/122 |
| 2014/0256850 A1* | 9/2014 | Gerard .................... C08L 33/12 |
| | | 523/222 |

* cited by examiner

US 11,578,159 B2

AIR VOID CONTROL COMPOSITION FOR CARBONYL-CONTAINING MONOMER POLYMERIZATION

This application claims benefit, under U.S.C. § 119 or § 365 of PCT Application Number PCT/US2017/066048, filed Dec. 13, 2017; and U.S. Provisional Application No. 62/434,010, filed Dec. 14, 2016; said applications incorporated herein by reference.

FIELD OF THE INVENTION

The invention relates to the use of low levels of glycols and short chain diols to control air void formation in any polymerization reaction having carbonyl-containing monomers, and preferably carboxylic acid ester monomers, at a level of at least 10% of total monomer, where the monomer has a peak polymerization exotherm temperature of greater than the boiling point of the monomer. The glycols and short chain diols are used in the polymization mixture at levels of 0.5 to 10 weight percent, based on the carboxylic acid ester-containing monomer. It is believed the glycols and short chain diols hydrogen bond with the —(C=O)O— containing monomer to increase the monomer boiling point, and decrease or even eliminate the formation of air voids due to monomer boiling. The invention is especially useful in polymerization of methyl methacrylate polymers and copolymers, either neat, or as a polymer composite system.

BACKGROUND OF THE INVENTION

The polymerization of carbonyl-containing vinyl monomers is an exothermic reaction. If the temperature of the reaction mixture exceeds the boiling point of the monomer (s), the monomer boils, resulting in undesirable bubble formation. In a viscous polymer system, the trapped bubbles remain in the solidified polymer product after polymerization as air voids. These air voids are defects that influence the mechanical properties of the cured polymer and compromise its long-term stability and aesthetics. This problem becomes more severe as the final articles become thicker, where heat transfer is more limited and the exotherm temperature gets higher. For a methyl methacrylate monomer system, exotherm temperature higher than 100° C. cause the formation of air voids.

Traditional methods for controlling the polymerization exotherm of carbonyl-containing monomer, such as PMMA and PMMA composites, involve conducting the polymerization in a mold surrounded by a cooling bath. Other strategies involve chemical methods such as the use of inhibitors and chain transfer agents. Although these chemical strategies can successfully reduce the exotherm temperature and lower air void formation, they interfere with the chemistry of polymerization by trapping the polymer radicals, which increases the cure time and reduce the molecular weight of the resulting polymer, causing a negative effect on polymer mechanical properties. There is a need for better strategies to mitigate the effect of the polymerization exotherm and lower or even eliminate air void formation in the cured polymer, while causing minimal or no impact on the cure kinetics and molecular weight of polymer. One system that is especially in need of such strategies is the polymerization of methyl methacrylate (MMA) into polymethyl methacrylate (PMMA) and its copolymers.

Surprisingly it has been found that the addition of low levels of one or more glycols and short chain diols in a MMA liquid resin system will reduce and even eliminate air void formation in the polymerized PMMA. The same effect is expected in any bulk polymerization involving carbonyl-containing monomers. While not being bound by any particular theory, it is believed that the addition of low levels of glycols and short chain diols, act as hydrogen bond donors, increases the boiling point of MMA, likely by forming hydrogen bonds with the MMA monomer. By increasing the boiling point of MMA above the temperature of the polymerization exotherm, air void formation can be eliminated. Depending on the chemical structure of the glycols and short chain diols, the low level of the additive in the composition has little or no effect on the cure kinetics and molecular weight of the PMMA product.

While the application will focus on (meth)acrylic monomers, and in particular on final polymers containing greater than 51 weight percent of methyl methacrylate, the principles and technical solution described would be expected to work efficiently in any polymerization involving at least 10% of carbonyl-containing monomers. The same mechanism achieving the same technical effect of controlling or eliminating air voids would be expected.

SUMMARY OF THE INVENTION

The invention relates to a polymerization reaction mixture comprising:
a) of 0.5 to 10 weight percent, preferably 1-5 weight percent, more preferably 2 to 4 weight percent, of one or more aliphatic glycols and short chain diols having carbon number from 2 to 6, and preferably 3 or 4, said percentage based on the weight of monomer, and
b) a monomer composition, wherein said monomer mixture comprises least 10 weight percent, more preferably at least 25 weight percent, more preferably 40 weight percent, more preferably at least 51 weight percent, more preferably at least 70 weight percent, more preferably at least 80 weight percent, and more preferably at least 90 weight percent of carbonyl-group-containing monomer.

The invention further relates to a thermoplastic article comprising:
a) a (meth)acrylic polymer matrix, and
b) from 0.5 to 10 weight percent of glycols and/or diols, based on the weight of the polymer,
wherein said article contains air voids less than 10 volume percent, preferably less than 5 volume percent, more preferably less than 1 volume percent, and most preferably less than 0.1 volume percent.

The invention further relates to a process for producing a low defect poly(meth)acrylate article comprising the step of adding to a reaction mixture, from process for producing a low defect poly(meth)acrylate article comprising the step of adding to a reaction mixture, 0.5 to 10 weight percent, preferably 1-5 weight percent, more preferably 2 to 4 weight percent, of one or more aliphatic glycols and short chain diols having carbon number from 2 to 6, and preferably 3 or 4, said percentage based on the weight of monomer.

DETAILED DESCRIPTION OF THE INVENTION

Figure 1:
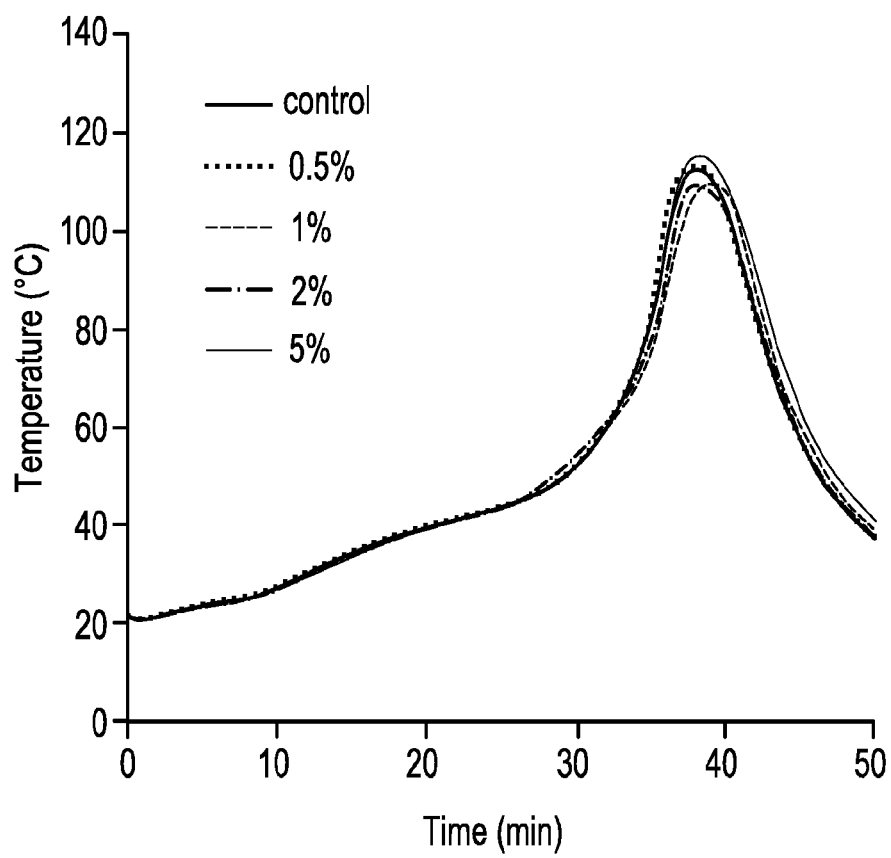
FIG. 1: Shows the effect of variable amounts of Triton X-100 on exotherm plots of neat MMA syrup polymerization in a test tube.

All references listed in this application are incorporated herein by reference. All percentages in a composition are weight percent, unless otherwise indicated, and all molecular weights are given as weight average molecular weight determined by Gel Permeation Chromatography (GPC) using a polystyrene standard, unless stated otherwise. Combinations of different elements described herein are also considered as part of the invention.

By the term "polymerization" as used herein denotes the process of converting a monomer or a mixture of monomers into a polymer.

By the term "thermoplastic polymer" as used herein denotes a polymer that turns to a liquid or becomes more liquid or less viscous when heated and that can take on new shapes by the application of heat and pressure.

By the term "thermosetting polymer" as used herein denotes a prepolymer in a soft, solid or viscous state that changes irreversibly into an infusible, insoluble polymer network by curing.

By the term "polymer composite" as used herein denotes a multicomponent material comprising multiple different phase domains in which at least one type of phase domain is a continuous phase and in which at least one component is a polymer.

By the term "initiator" as used herein denotes a chemical species that react with a monomer to form an intermediate compound capable of linking successively with a large number of other monomers into a polymeric compound.

The term "copolymer" as used herein denotes a polymer formed from two or more different monomer units. The copolymer may be random, block, or tapered, and can be straight chain, branched or have any other configuration, such as, but not limited to star polymers, comb polymers and core-shell copolymers.

The present invention relates to the use of low levels of glycols and short chain diols to reduce and even eliminate air voids in articles formed from carbonyl-containing monomers, including neat polymers and composites.

Carbonyl Containing Monomers

The invention solves the technical problem of reducing or eliminating air void formation in a polymer formed from a monomer composition having at least 10 weight percent, more preferably at least 25 weight percent, more preferably 40 weight percent, more preferably at least 51 weight percent, more preferably at least 70 weight percent, more preferably at least 80 weight percent, and more preferably at least 90 weight percent of carbonyl-group-containing monomer. A homopolymer or copolymer formed from 100 weight percent carbonyl-group-containing monomer, and especially 100 weight percent of one or more (meth)acrylic monomers is a preferred embodiment of the invention. The invention will be described in terms of (meth)acrylic monomers, however one of ordinary skill in the art will recognize that the same technical solution can be applied to any monomer system in which amines can effectively hydrogen bond to the monomer units.

(Meth) acrylic monomers useful in the invention include, but are not limited to, methyl methacrylate, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer composition.

From 0 to 90 weight percent, and preferably less than 50 weight percent, more preferably less than 20 weight percent of non-carbonyl-containing monomers may also be present. Useful non-carbonyl-containing monomers include, but are not limited to styrene, alpha methyl styrene, acrylonitrile, and crosslinkers at low levels may also be present in the monomer mixture.

The term "PMMA" as used herein, means homopolymers and copolymers having two or more different monomer units containing at least 50 weight percent of methyl methacrylate monomer units. Most preferably the PMMA polymer is a homopolymer or a copolymer having 70-99.9 weight percent and more preferably 80 to 99 percent of methyl methacrylate units and from 0.1 to 30 weight percent of one or more $C_{1-8}$ straight or branched alkyl acrylate units. Preferably, any comonomer should have a boiling point near or above the polymerization exotherm temperature.

In the description below, PMMA is used as a model polymer system to describe the principles of the present invention. One of ordinary skill in the art can apply these same principles to other polymer systems containing at least 10 weight percent of carbonyl-containing monomer(s).

PMMA polymerization of the invention is generally a semi-bulk process, normally performed by first a partial polymerization to form a syrup containing unreacted monomer, oligomer and polymer. Additional initiator is added to the syrup, which is then placed into a mold or cast into sheets, where final polymerization into a solid polymer article occurs.

Alternatively, a bulk process can also be used, where all monomer, initiator and other additives are placed into the initial charge, and the reaction started until full polymerization occurs. The weight-average molecular mass of the PMMA polymer should be high, meaning more than 50,000 g/mol, preferably more than 80,000 g/mol, and preferably more than 100,000 g/mol. The molecular weight may be up to 2,000,000 g/mol, and preferably less than 300,000 g/mol.

Another preferred embodiment involves dissolving PMMA polymer in monomer composition—which is largely or completely composed of MMA. This polymer/monomer mixture provides viscosity control of the viscous syrup solution. This PMMA syrup is then combined with additional initiator, and placed into a mold (that could contain oriented fibers of a fiber mat for a reinforced composite), or impregnated into long fibers, where final polymerization occurs, producing a final thermoplastic article.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The polymer formed by the polymerization using the composition of this invention may be either a thermoplastic or a thermoset polymer.

Glycols and Short Chain Diols

Low levels of aliphatic glycols and short chain diols can be added to the PMMA polymerization mixture to act as hydrogen bond donors that can increase the boiling point of methyl methacrylate (MMA) monomer. By raising the MMA boiling point above the reaction temperature created by the polymerization exotherm, air void formation in the PMMA syrup can be reduced and even eliminated. The glycols and short chain diols should be compatible with methacrylic monomer.

Preferably the glycols and short chain diols are used at low levels, and have little or no negative affect on the reaction kinetics or molecular weight. The diols and glycols are used at a level of 0.5 to 10 weight percent, preferably 1-5 weight percent, more preferably 2 to 4 weight percent, of one or more glycols and short chain diols, said percentage based on the weight of MMA monomer.

Glycols and short chain diols, are especially useful as hydrogen bond donors in the invention due to their low cost and minimal environmental impact. By "short chain" is meant diols having carbon number from 2 to 6, and preferably 3 or 4. Useful diols and glycols for reducing and even eliminating aid void formation can be hydrophilic, hydrophobic, or amphiphilic. Useful glycols include, but are not limited to, glycerol, 1,2- and 1,3-propylene glycol, diethylene glycol, and TRITON X-100 ($C_{14}H_{22}O(C_2H_4O)_n$) from Dow Chemical. Especially useful oligoethylene glycols are those of the structure H—(O—$CH_2$—$CH_2$)$_n$—OH, where n=2 to 50. Useful polyethylene glycols are those where n=51 to 200. It has been found that the hydrophobic glycols are more effective in void elimination than the hydrophilic glycols, with the hydrophilic glycols causing slightly more hazy and less transparent articles. While not being bound by any particular theory, it is believed this observation is related to the hygroscopic nature of the hydrophilic glycols—which increases the water content in the cured PMMA. Short chain aliphatic diols are also effective in air void formation, but to a lesser degree than the hydrophobic glycols. Useful diols include, but are not limited to, 1,3-butanediol, and 1,4-butane diol.

The glycols and diols can be added to the reaction mixture any time prior to the development of the peak polymerization exotherm, since it is stable and has little or no effect on the reaction kinetics. When the reaction mixture has a low viscosity (early in the polymerization) any air void formed has a high probability of escaping the low viscosity, low polymer content reaction mixture. The larger problem with air void formation is when the polymerization mixture has developed a higher viscosity, and air void become entrapped in the polymerizing fluid. Generally, the glycol and diols can be added at or near the beginning of the bulk polymerization, or prior to initiation of a prepolymer syrup in a two-stage polymerization.

Other Additives:

Other additives typically used in acrylic polymers may be added to the reaction mixture, including impact modifiers, and other additives typically present in polymer formulations, including but not limited to, stabilizers, plasticizers, fillers, coloring agents, pigments, dyes, antioxidants, antistatic agents, surfactants, toner, refractive index matching additives, additives with specific light diffraction, light absorbing, or light reflection characteristics, flame retardants, density reducers, surface leveling agents and dispersing aids, low profile additives (acrylics, poly vinyl acetate), acrylic beads, low molecular weight acrylic process aids—such as low molecular weight (less than 100,000, preferably less than 75,000 and more preferably less than 60,000 molecular weight), and low viscosity or low Tg acrylic resins (Tg<50° C.).

If the polymer, such as PMMA, is formed from a polymer syrup having monomer and dissolved polymer and/or oligomer, in addition to initiator it may optionally contain inhibitors, activator, and chain transfer agents.

An inhibitor is optionally present to prevent the monomer from spontaneously polymerizing. The (meth)acrylic monomer is typically one or more monomers as defined above with, optionally, a suitable inhibitor such as hydroquinone (HQ), methyl hydroquinone (MEHQ), 2,6-di-tertiary-butyl-4-methoxyphenol (TOPANOL O) and 2,4-dimethyl-6-tertiary-butyl phenol (TOPANOL A).

The liquid (meth) acrylic syrup optionally comprises an activator for the polymerization.

A polymerization activator or accelerator is chosen from tertiary amines such as N,N-dimethyl-p-toluidine (DMPT), N,N-dihydroxyethyl-p-toluidine (DHEPT), Bisomer PTE, organic-soluble transition metal catalysts or mixtures thereof.

If present, the content of the activator with respect to the to the (meth)acrylic monomer of the liquid (meth) acrylic syrup is from 100 ppm to 10000 ppm (by weight), preferably from 200 ppm to 7000 ppm by weight and advantageously from 300 ppm to 4000 ppm.

The presence of activators or accelerators depends upon the final application. Where "cold-cure" is necessary or wished, an accelerator is usually necessary. Cold cure means that the polymerization takes place at ambient temperature, meaning less than 50° C. or preferably less than 40° C.

An initiator is added to the PMMA syrup just before the syrup is added into a mold. The initiator is preferably one that has a half-life below 100° C. that is sufficient to drive the polymerization. Preferably the initiator is a radical initiator from the class of diacyl peroxides, peroxy esters, dialkyl peroxides, peroxyacetals or azo compounds.

The initiator or initiating system for starting the polymerization of the (meth) acrylic monomer is preferably chosen from isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azobis (2,4-dimethylvaleronitrile) or 4,4'-azobis(4-cyanopentanoic). It would not be departing from the scope of the invention to use a mixture of radical initiators chosen from the above list.

Preferably the initiator or initiating system for starting the polymerization of the (meth) acrylic monomer is chosen from peroxides having 2 to 20 carbon atoms The content of radical initiator with respect to the (meth) acrylic monomer of the liquid (meth) acrylic syrup is from 100 to 50000 ppm by weight (50000 ppm=5 wt %), preferably between 200 and 40000 ppm by weight and advantageously between 300 and 30000 ppm. The initiator is added to the syrup just prior to production.

Another ingredient in the liquid resin can also be a chain-limiting agent in order to control the molecular weight, for example γ-terpinene, terpinolene, and 1,4-cyclohexadiene, at contents of between 0 and 500 ppm and preferably between 0 and 100 ppm, with respect to the monomers of the mixture.

In one preferred embodiment, one or more additional means of controlling the exotherm, or the effect of the exotherm are further added—providing a synergy that allows for lower use levels of each additive. This allows one of ordinary skill in the art to combine two or more additives based on the chemistry (homopolymer, copolymer composition), the molecular weight requirements, and the thickness and end-use of the final article.

In addition to oligomers and diols, other additives for synergistically controlling the effect of the polymerization exotherm include low levels 100 to 5000 ppm of aliphatic amines which also effectively raise the boiling point of MMA. Aliphatic short chain fatty esters can aid in heat dissipation, which dissipates the generated heat and reduces monomer boiling. Low amount of chain transfer agents can also be added to further reduce the amount of generated heat. One of ordinary skill in the art, based on the information in this patent application and others filed by Applicant, as well as the Examples, can easily mix and match different means of increasing the MMA boiling point exotherm control and heat dissipation, to arrive at an optimum formulation for each individual situation. All levels of exotherm effect control are based on the total of carbonyl-containing monomer.

Process

In one embodiment of the invention, a PMMA syrup is used to form a PMMA polymer or polymer composite. The MMA syrup is composed of monomer in which polymer and/or oligomer is dissolved, is formed by either a partial polymerization of monomers, or by dissolving polymer and/or oligomer into the acrylic monomers.

In one preferred embodiment, a PMMA syrup consisting of PMMA monomer and PMMA polymer combined with fibers to form a thermoplastic composite. Preferably, the monomer/polymer acrylic syrup in the composite-forming syrup contains less than 10 weight percent, preferably less than 5 weight percent, more preferably less than 1 weight percent, and most preferably is free of oligomer. By oligomer, as used herein is meant a degree of polymerization of between 2 and 25 monomer units.

The PMMA polymer is fully soluble in the (meth)acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth) acrylic syrup is between 10 mPa·s and 10 000 mPa·s, preferably between 50 mPa·s and 5000 mPa·s and advantageously between 100 mPa·s and 1000 mPa·s. The viscosity of the syrup can be readily measured with a rheometer or a viscometer. The dynamic viscosity is measured at 25° C. The liquid (meth)acrylic syrup has Newtonian behavior, meaning that there is no shear-thinning, so that the dynamic viscosity is independent of the shear in a rheometer or of the speed of the spindle in a viscometer. Such a viscosity of the syrup obtained allows correct impregnation of the fibers of the fibrous substrate.

Advantageously, the liquid (meth)acrylic syrup contains no additional voluntarily added solvent.

The PMMA syrup can become fully polymerized into a solid polymer by placing the syrup into a mold, adding initiator, and adding heat to begin further polymerization. The mold could be an open mold or a closed mold, and may be a thin flat mold, such as for making PMMA sheet (such as PLEXIGLAS® acrylic sheet), or may be placed into a mold having the shape of the desired final part.

In a preferred embodiment, the PMMA syrup is infused into a mold via vacuum infusion and left to cure at room temperature for a certain amount of time, depending on the target application.

In one embodiment, the mold may contain a grid of fiber reinforcement that becomes embedded in, and reinforces the PMMA article.

In another embodiment, fibers can be impregnated with the PMMA syrup, and then wound onto a mold then polymerized to form a hollow fiber-reinforced article. The composition of the invention reduces or eliminates air void formation during the exothermic polymerization.

Uses:

The reduction and even elimination of air void defects in a PMMA article results in an improvement in mechanical properties, long term stability, transparency, and appearance. The PMMA articles made using the diol or glycol of the invention range from cast sheet, to large PMMA fiber composites in wind blades. Other articles that can be made using the composition of the invention include, but are not limited to, automotive parts, building and construction components, medical applications, sporting goods.

Glycols and diols of the invention can be used to reduce or eliminate air voids in any (meth)acrylic thermoplastic or thermoset resin in which the exothermic temperature is higher than the boiling point of the constituent (meth)acrylic monomer in the composition.

The level of air voids in the final product of the invention are less than 10 volume percent, preferably less than 5 volume percent, more preferably less than 1 volume percent, and most preferably less than 0.1 volume percent.

One preferred use is in the formation of a fiber-reinforced thermoplastic composite, which is an alternative to thermoset resins, such as epoxies. The thermoplastic composite, available under the tradename ELIUM® from Arkema, can be combined with fiber reinforcement by several means, including but not limited to impregnation of the fibers followed by fiber-winding and curing, pultrusion of a fiber/ELIUM® syrup followed by curing, and the addition of ELIUM® syrup to an open or closed mold, following by curing. The curing could occur at elevated temperatures, or with the proper initiator, can occur at room temperature.

With regard to the fibrous substrate, one can mention fabrics, felts or nonwovens that may be in the form of strips, laps, braids, locks or pieces. The fibrous material can have different forms and dimensions either one dimensional, two dimensional or three dimensional. A fibrous substrate comprises an assembly of one or more fibres. When the fibres are continuous, their assembly forms fabrics. Chopped fibers could also be used to provide reinforcement in a polymer composite.

The one dimensional form is linear long fibers. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional fibers could be fibrous mats or non woven reinforcements or woven roving or bundles of fibers, which can also be braided.

The fibrous substrate of the present invention is chosen from vegetable fibres, wood fibres, animal fibres, mineral fibres, synthetic polymeric fibers, glass fibers, carbon fibers or mixtures thereof.

Natural fibers are for example sisal, jute, hemp, flax, cotton, coconut fibers, and banana fibers. Animal fibers are for example wool or hair. As synthetic material one can mention polymeric fibers chosen from fibers of thermosetting polymers, from thermoplastic polymers or their mixtures. The polymeric fibers can be made of polyamide (aliphatic or aromatic), polyester, polyvinylalcohol, polyolefins, polyurethanes, polyvinylchloride, polyethylene, unsaturated polyesters, epoxy resins and vinylesters.

The mineral fibers can also be chosen from glass fibers especially of type E, R or S2, carbon fibers, boron fibers or silica fibers.

The level of fiber in the fiber reinforced composite articles is from 20 to 90 weight percent, preferably from 40 to 80 weight percent, and most preferably from 60 to 70 weight percent.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

1. A polymerization reaction mixture comprising:
   a) of 0.5 to 10 weight percent, preferably 1-5 weight percent, more preferably 2 to 4 weight percent, of one or more aliphatic glycols and short chain diols having carbon number from 2 to 6, and preferably 3 or 4, said percentage based on the weight of monomer; and
   b) a monomer composition, wherein said monomer mixture comprises least 10 weight percent, more preferably at least 25 weight percent, more preferably 40 weight percent, more preferably at least 51 weight percent, more preferably at least 70 weight percent, more preferably at least 80 weight percent, and more preferably at least 90 weight percent of carbonyl-group-containing monomer.

2. The polymerization reaction mixture of aspect 1, wherein said monomer composition comprises at least 90 weight percent, preferably at least 95 weight percent, of one or more (meth)acrylic monomers.

3. The polymerization reaction mixture of aspects 1 and 2, wherein said (meth)acrylic monomers comprise at least 51 percent by weight of methyl methacrylate monomer, and from 0 to 49 weight percent of $C_{1-8}$ alkyl acrylates.

4. The polymerization reaction mixture of any of aspects 1 to 3, wherein said glycols and short chain diols include one or more diols selected from the group consisting of 1,2-propylene glycol, 1,3-propylene glycol, diethylene glycol, TRITON X-100 ($C_{14}H_{22}O(C_2H_4O)_n$), oligoethylene glycols of structure H—(O—CH$_2$—CH$_2$)$_n$—OH, where n=2 to 50, and polyethylene glycols where n=51 to 200, glycerol, 1,3-butanediol, 1,4-butane diol, and ethylene diol.

5. The polymerization reaction mixture of any of aspects 1 to 4, wherein said reaction mixture is a syrup further comprising 1 to 80, and preferably 10 to 60 weight percent of (meth)acrylic polymer.

6. The polymerization reaction mixture of aspect 5, wherein said (meth)acrylic polymer comprises polymethyl methacrylate.

7. The polymerization reaction mixture of any of aspects 1 to 6, wherein said reaction mixture further comprises of one or more additional air void control substances selected from the group consisting of up to 20, preferably up to 10, and more preferably up to 5 weight percent, based on the total weight of monomer of glycols, diols, chain transfer agents, and aliphatic short chain fatty esters, and 100 to 5000 ppm of aliphatic primary and secondary amines.

8. A thermoplastic article comprising:
   a) a (meth)acrylic polymer matrix, and
   b) from 0.5 to 10 weight percent of glycols and/or diols, based on the weight of the polymer,
   wherein said article contains air voids less than 10 volume percent, preferably less than 5 volume percent, more preferably less than 1 volume percent, and most preferably less than 0.1 volume percent.

9. The thermoplastic article of aspect 8, wherein said thermoplastic article further comprises one or more other exotherm control additives at a level of from 0.6 to 20, preferably up to 10, and more preferably up to 5 weight percent, selected from the group consisting of diols, glycols, chain transfer agents, aliphatic short-chain esters.

10 The thermoplastic article of any of aspects 8 and 9, wherein said article further comprises from 20 to 90 weight percent, preferably from 40 to 80 weight percent, and most preferably from 60 to 70 weight percent, of fibres.

11. A process for producing a low defect poly(meth)acrylate article comprising the step of adding to a reaction mixture, 0.5 to 10 weight percent, preferably 1-5 weight percent, more preferably 2 to 4 weight percent, of one or more aliphatic glycols and short chain diols having carbon chains of from 2 to 6, and preferably 3 or 4 in length, said percentage based on the weight of monomer.

EXAMPLES

Example 1

Figure 2:
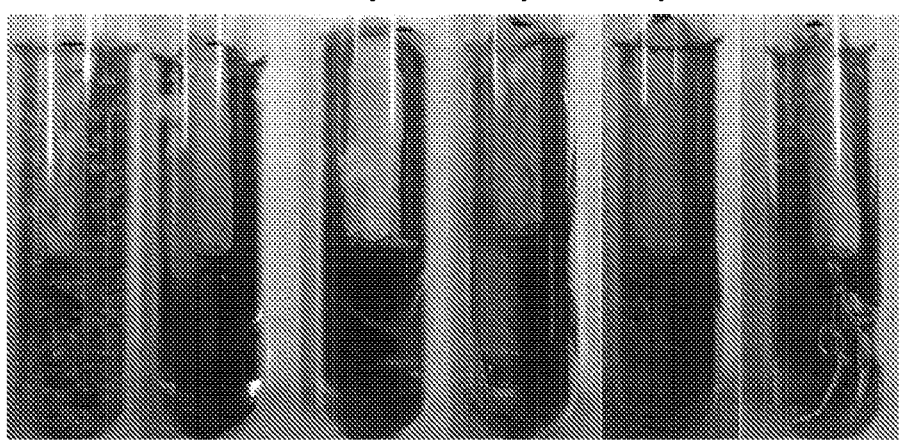
FIG. 2: Shows the effect of variable amounts of Triton X-100 on the appearance of cured resin (bottom) of neat MMA syrup polymerization in a test tube.

25 g of an MMA syrup containing PMMA dissolved in MMA monomer was initially mixed in a plastic cup with 3 g of BPO peroxide initiator (AFR40) and variable amounts of diols or glycols, and the mixture was then transferred into a test tube. A thermocouple was inserted in the center of the tube and secured by a rubber stopper. The assembly was then placed in an oil bath with a fixed temperature of 27° C. Exotherm (time/temperature) curves were then generated for each diol or glycol amount and compared with the control (no additive). Peak exotherm temperature was considered the highest temperature in the exotherm plot, and the corresponding time (in minutes) was considered the peak exotherm time. The exotherm data for TRITON X-100 is shown in FIG. 1, demonstrating almost no effect of the glycol on the cure time or temperature. Pictures of the test tubes showing air voids with different levels of several glycols is shown in FIG. 2.

Quantitative Air Void Assessment Method:

The cured neat resins in the test tubes were pictured by a high resolution camera to generate digital photographs of test tubes. A method was devised with a drawing tool in IGOR PRO7 to calculate the area covered by bubbles in the digital photographs [as an indicator of the true total volume occupied by the air voids. Issues with run-to-run reproducibility of the control (no additive) experiments combined with data analysis uncertainty [estimated±10% error bars for void quantification] make the void assessment using the optical analysis technique most useful for extracting trends in additive effects. Preliminary analysis of the available data indicates that the calculated void volumes were found to track well with qualitative (visual) assessment, with void volume generally decreasing with increasing loading of additive.

Figure 3:
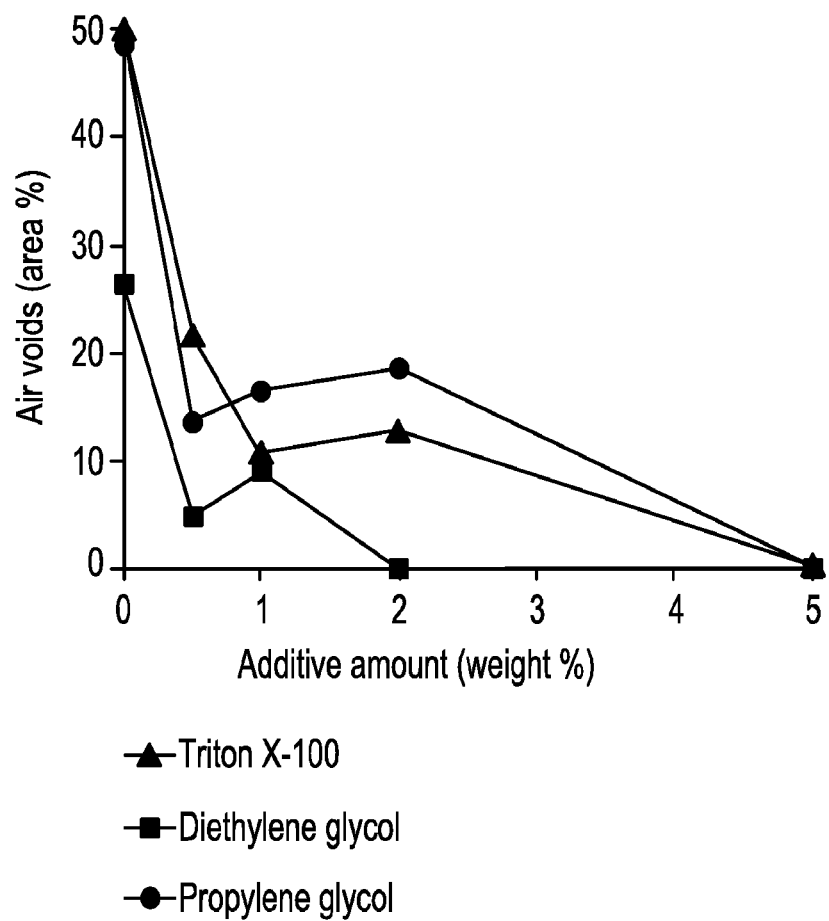
FIG. 3: Demonstrates the quantitative air void assessment (area percent of air voids) measurements of cured (polymerized) MMA syrup in the presence of variable amounts of representative examples of glycols.

The air void level for different at different loading levels of glycol and diol is shown in FIG. 3, and in Table 1:

TABLE 1

| Additive | Amount (wt %) | Area (%) of Air Voids | Peak Exotherm Temp (° C.) | Peak Exotherm Time (min) |
|---|---|---|---|---|
| No Additive (control) | — | 50 | 113 | 38 |
| Triton X-100 | 1 | 11 | 115 | 38 |
|  | 5 | 0.3 | 109 | 39 |
| Propylene glycol | 1 | 9 | 112 | 37 |
|  | 5 | 0 | 109 | 38 |
| Diethylene glycol | 1 | 17 | 111 | 40 |
|  | 5 | 0.2 | 110 | 46 |

What is claimed is:

1. A polymerization reaction mixture comprising:
   a) an exotherm control additive comprising 4 to 10 weight percent of one or more aliphatic glycols and short chain diols having from 2 to 6 carbon atoms, said percentage based on the weight of monomer mixture in the reaction mixture;
   b) a monomer mixture, wherein said monomer mixture comprises at least 10 weight percent of carbonyl-group-containing monomer; and
   c) 1 to 80 weight percent of (meth)acrylic polymer,
   wherein the polymerization reaction mixture is in the form of a (meth)acrylic syrup having a dynamic viscosity at 25° C. of between 50 mPa·s and 10,000 mPa·s.

2. The polymerization reaction mixture of claim 1, wherein said monomer mixture comprises at least 90 weight percent of one or more (meth)acrylic monomers.

3. The polymerization reaction mixture of claim 2, wherein said (meth)acrylic monomers comprise at least 51 percent by weight of methyl methacrylate monomer, and from 0 to 49 weight percent of $C_{1-8}$ alkyl acrylates.

4. The polymerization reaction mixture of claim 1, wherein said aliphatic glycols and short chain diols are selected from the group consisting of 1,2-propylene glycol, 1,3-propylene glycol, diethylene glycol, TRITON X-100 ($C_{14}H_{22}O(C_2H_4O)_n$), oligoethylene glycols of structure H—(O—CH$_2$—CH$_2$)$_n$—OH, where n=2 to 50, and polyethylene glycols having repeating units of from 51 to 200, glycerol, 1,3-butanediol, and 1,4-butane diol.

5. The polymerization reaction mixture of claim 1, wherein said (meth)acrylic polymer comprises polymethyl methacrylate.

6. The polymerization reaction mixture of claim 1, wherein said reaction mixture further comprises one or more additional exotherm control additives selected from the group consisting of:
   (i) up to 20 weight percent of an additive selected from the group consisting of glycols, diols, chain transfer agents and aliphatic short chain fatty esters, based on the total weight of the monomer mixture, and
   (ii) from 100 to 5000 ppm of an additive selected from the group consisting of aliphatic primary and secondary amines, based on the total weight of the monomer mixture.

7. The polymerization reaction mixture of claim 1, wherein the exotherm control additive comprises one or more aliphatic glycols and short chain diols having from 3 to 4 carbon atoms.

* * * * *